Oct. 21, 1952     F. H. STEEL     2,614,532

AUTOMATIC FLOAT-ACTUATED WATERING DEVICE FOR FARM ANIMALS

Filed July 19, 1950

INVENTOR
Frederick H. Steel

BY W. S. McDowell
ATTORNEY

Patented Oct. 21, 1952

2,614,532

UNITED STATES PATENT OFFICE 2,614,532

AUTOMATIC FLOAT-ACTUATED WATERING DEVICE FOR FARM ANIMALS

Frederick H. Steel, Chillicothe, Ohio

Application July 19, 1950, Serial No. 174,627

1 Claim. (Cl. 119—78)

This invention relates to appliances for supplying drinking water for consumption by farm animals, an object of the invention being to provide an efficient and simple device of this character in which the supply of water delivered to a drinking pan, and the level of the water maintained in said pan, are controlled automatically by a float actuated mechanism.

It is another object of the invention to provide a farm stock watering device which may be maintained readily in a sanitary and cleanly condition and wherein provision is made for housing and protecting the float-actuated valve mechanism used in maintaining a predetermined level of water in an associated open-topped drinking pan.

It is another object of the invention to provide an animal-watering device of the character indicated with a float-enclosing housing comprising a base and a cover section arranged to receive and surround the central region of an elongated open-topped drinking pan, and wherein said housing and pan interlock in order that the parts of the device may maintain a fixed predetermined relationship which can not be disturbed by the forces and actions set up by drinking farm animals.

With these and other objects in view, the invention consists in the novel features of construction and combination of parts as hereinafter set forth and pointed out in the claim.

Figure 1:
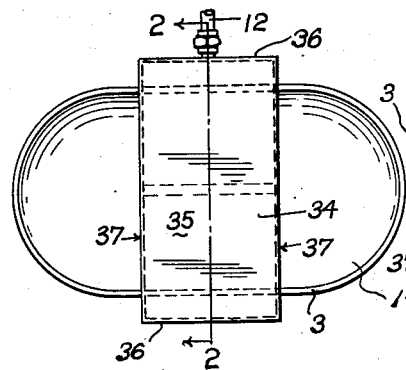
Fig. 1 is a top plan view of a watering device for farm live stock embodying the present invention.
Figure 2:
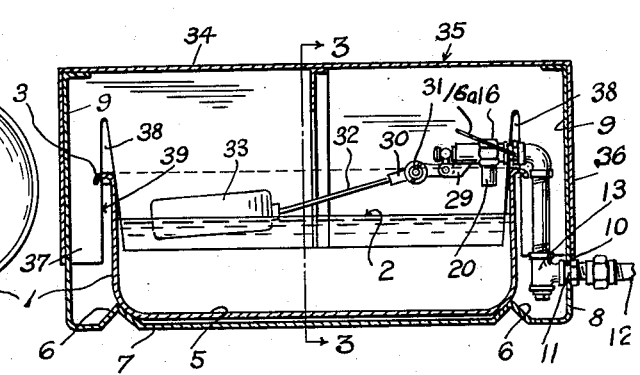
Fig. 2 is an enlarged vertical transverse sectional view taken through the device on the plane indicated by the line 2—2 of Fig. 1.
Figure 3:
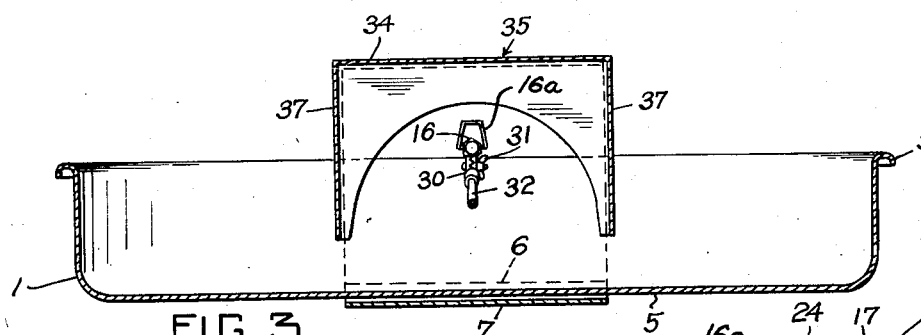
Fig. 3 is an enlarged vertical longitudinal sectional view taken through the device on the line 3—3 of Fig. 2.
Figures 4, 5:
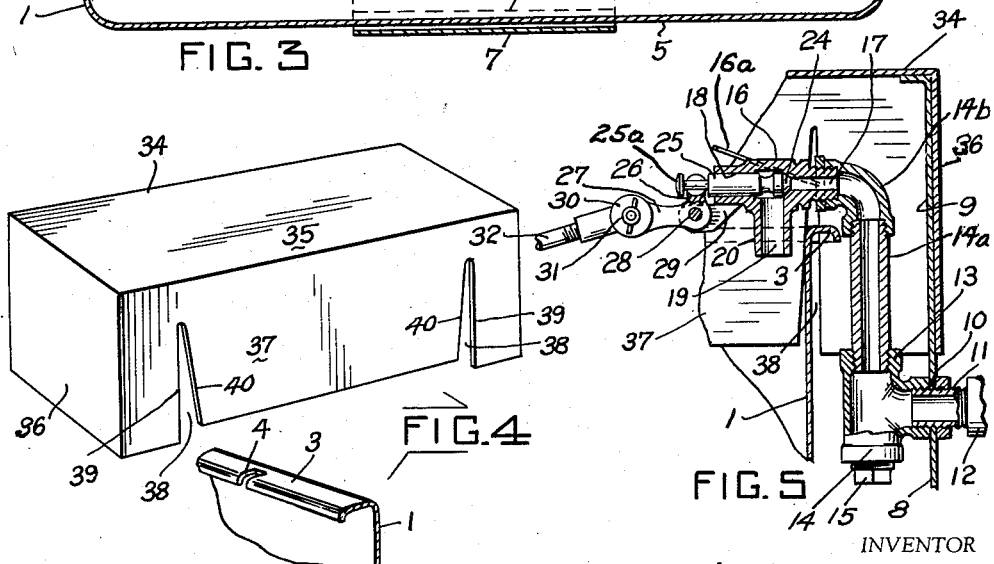
Fig. 4 is a group perspective view of the float valve cover and the associated recessed flange of the drinking pan with which the cover has interlocking engagement.
Fig. 5 is an enlarged fragmentary vertical sectional view taken through the float-actuated valve fount of my improved drinking device.

In the drawing, the numeral 1 represents an elongated open-topped drinking pan into which a body of water disclosed at 2 is maintained for the drinking requirements of farm animals or the like. In this instance, the pan is of sheet metal construction, having the upper portions thereof formed with an outwardly and downwardly directed reinforcing flange 3, the said flange being provided with a plurality of longitudinally spaced notches 4 in each of its opposite sides. In this instance, the bottom 5 of the pan rests is positioned between a pair of transversely spaced, parallel, longitudinally extending positioning ribs 6 which are struck upwardly from the bottom wall 7 of a housing base 8, the latter being also preferably formed from sheet metal and is provided at the opposite ends of the wall 7 with upwardly directed end walls 9.

At one end, the base 8 is provided centrally thereof with an opening 10 through which passes a fitting 11 provided on a water-supplying pipe line 12, leading from a suitable source of water supply, as for example, an elevated tank, not shown, or a supply main in which water is maintained under pressure. The fitting 11 communicates with a T-fitting 13 which includes a downwardly opening pipe connection 14 into which water may be led from any suitable source in the event it is impracticable for various reasons to cause the water supply line to enter through the side of the base. If the pipe connection 14 is not needed, the same may be capped and closed as at 15.

Threadedly connected with the upper end of the T-fitting 13 is a vertical branch conduit 14a which is connected at its upper end with an elbow fitting 14b. The elbow receives the screw-threaded inlet end of a valve casing 16.

The casing 16 includes horizontal passages or bores 17 and 18 which communicate at their adjacent ends with a vertical bore 19 provided in an outlet extension 20 which projects downwardly into the upper portion of the pan 1. The passage 17 is normally closed by the tappered head 24 of a sliding valve 25 which is positioned in the horizontal passage 18. The valve 25 includes an actuator stem 25a which projects outwardly from the casing 16 and is annularly grooved to receive the yoke-shaped end 26 of a bell-crank float attaching lever 27. This lever is pivoted, as at 28, for turning movement about a horizontal axis provided by ears 29 projecting from the underside of the casing 16. The outer portion of the lever 27 is provided with a circular enlargement which, advantageously, may be provided with serrated radially disposed teeth which register with corresponding teeth provided on the circular head of a fitting 30, a threaded binding device 31 being used to maintain the circular heads and serrated faces together so that the float arm-carrying fitting 30 may be adjusted about a horizontal axis relative to the lever 27 to regulate the height of the liquid level maintained in the pan 1.

The fitting 30 has a threaded bore formed therein to receive the inner end of a float arm 32, the outer end of said arm being equipped with a buoyant float member 33 adapted to be supported by the body of water 2 and to respond to fluctuations in the level of said body of water to open and close the valve in the valve fount.

Advantageously, the valve fount may be provided with a means to lock the valve against operation when it is desired to disassemble or repair certain parts of the apparatus. Toward this end, I provide a U-shaped locking bail 16a which is pivotally carried on the valve casing for swinging movement into the annularly recessed portion formed on the actuator stem 25a to lock the valve 25 against unseating movement. The bail 16a is illustrated in its inoperative position in the drawing, and to bring the same into locking position, the bail is merely swung downwardly behind the body of the valve 25 to hold the same in its seated position, and thereby prevent the flow of water through the valve.

With the construction and arrangement of parts above described, it will be seen that water will be maintained in the pan at a level readily reached by drinking farm animals. The construction has the advantage of mechanical simplicity and economy of manufacture, being formed mainly of sheet metal parts capable of being easily and cheaply produced.

The float-actuated valve mechanism is protected against injury by the drinking animals through the provision of a sheet metal cover member 34, which forms a part of the float-valve housing. This cover includes a horizontal top wall 35, depending vertical end walls 36 which lie closely adjacent to the end walls 9 of the base 8, and transversely extending parallel side walls 37. These side walls are recessed, as at 38, in order that the same may receive the upstanding side walls of the pan 1 and their flanges 3. The vertical edges shown at 39 of the side wall recesses 38 are adapted to enter the notches 4 provided in the flanges 3, and to be securely positioned in said notches by the action of the angularly diverging beveled edges 40 of the side walls 37. The shape of the edges 39 and 40 is such as to cause the same to exert a wedge-like action on the pan when the cover member 34 occupies its full downward position on the base 8.

In this manner, the float valve mechanism is completely enclosed by the housing and protected from injury by drinking animals, relative longitudinal movement between the pan and the housing being specifically precluded when the parts of the device are operatively assembled. All parts are readily accessible, however, for repair, adjustment or replacement purposes.

In view of the foregoing, it will be seen that the present invention provides an efficient and useful watering trough for livestock, the same being characterized by its rugged construction, its positive action in maintaining a constant predetermined level of drinking water within the trough, and ability to protect the mechanical parts of the float valve assembly from abuse by drinking animals.

While a single preferred construction has been illustrated in detail, it will be understood that various modifications in constructional details may be resorted to without departing from the spirit of the invention or the scope of the following claim.

I claim:

In a livestock watering trough including an open top receptacle and a float-actuated valve for controlling the passage of water to said receptacle; a U-shaped receptacle-supporting frame including a bottom wall and upstanding side walls, the bottom wall of said frame being formed with a pair of longitudinally spaced and upwardly projecting ribs between which said receptacle is positioned to prevent relative transverse displacement between said frame and receptacle; and a cubical cover guard having a top wall arranged to extend over and transversely across said receptacle to cover said valve and the intermediate portion of said receptacle, said cover guard being formed with depending side wall members having a plurality of vertically arranged slots to receive the upper side walls of said receptacle and a pair of spaced parallel end walls for removable frictional engagement with the side walls of said frame, the side walls of said guard, when the latter is positioned on said frame, extending downwardly into said receptacle on either side of said valve.

FREDERICK H. STEEL.

REFERENCES CITED

The following references are of record in the file of this patent:

UNITED STATES PATENTS

| Number | Name | Date |
|---|---|---|
| 1,476,095 | Morgan | Dec. 4, 1923 |
| 1,477,447 | Ritchie | Dec. 11, 1923 |
| 1,543,375 | Filer | June 23, 1925 |
| 2,241,636 | Eliason | May 13, 1941 |